United States Patent

Salmimaa et al.

(10) Patent No.: US 6,668,177 B2
(45) Date of Patent: Dec. 23, 2003

(54) METHOD AND APPARATUS FOR DISPLAYING PRIORITIZED ICONS IN A MOBILE TERMINAL

(75) Inventors: Marja Salmimaa, Tampere (FI); Tero Hakala, Kangasala (FI); Juha Lehikoinen, Lakiala (FI)

(73) Assignee: Nokia Corporation, Espoo (FI)

( * ) Notice: Subject to any disclaimer, the term of this patent is extended or adjusted under 35 U.S.C. 154(b) by 445 days.

(21) Appl. No.: 09/842,211

(22) Filed: Apr. 26, 2001

(65) Prior Publication Data

US 2002/0160817 A1 Oct. 31, 2002

(51) Int. Cl.[7] ............................. H04B 1/38; H04M 1/00
(52) U.S. Cl. ................. 455/566; 455/456.3; 455/556.2; 345/815
(58) Field of Search .......................... 455/456.1, 456.3, 455/556.1, 556.2, 557, 566; 345/788, 789, 800, 801, 810, 811, 815, 835

(56) References Cited

U.S. PATENT DOCUMENTS

| | | | |
|---|---|---|---|
| 5,365,360 A | * 11/1994 | Torres | 345/839 |
| 5,406,307 A | 4/1995 | Hirayama et al. | |
| 5,565,888 A | 10/1996 | Selker | |
| 6,047,197 A | 4/2000 | Jarrad | 455/556.1 |
| 6,084,951 A | * 7/2000 | Smith et al. | 455/564 |
| 6,091,956 A | 7/2000 | Hollenberg | |
| 6,342,894 B1 | * 1/2002 | Nojiri | 345/810 |

FOREIGN PATENT DOCUMENTS

| | | |
|---|---|---|
| WO | WO99/21164 | 4/1999 |
| WO | WO99/49453 | 9/1999 |
| WO | WO 00/65429 | 11/2000 |

* cited by examiner

Primary Examiner—Quochien Vuong
(74) Attorney, Agent, or Firm—Banner & Witcoff, Ltd

(57) ABSTRACT

An apparatus and method for displaying a plurality of icons on the display of a mobile terminal are provided. One or more characteristics associated with each icon are compared to one or more context values, such as time of day, geographic area, or user profile characteristics. Icons that best match one or more context values are represented in a display format that is enlarged in relation to other icons on the display device. The context values may include dynamically changing information, such as a current location of the user, so that as the user moves to a different geographic area, different icons are enlarged on the display device. The icons can correspond to application programs; logos (such as a corporate logo); documents; Web sites; or other objects. The icons can be grouped into a context bar that is displayed along an edge of the display device, and can be arranged in a horizontal, vertical, or mixed fashion. A magnifying glass metaphor can be moved over icons to highlight and select an icon.

54 Claims, 8 Drawing Sheets

USER A PROFILE

| PRIORITY | CONTEXT VALUE |
|---|---|
| 1 | PROXIMITY |
| 2 | TYPE OF ESTABLISHMENT (FOOD, RETAIL, MOVIES, TRANSP.) |
| 3 | AVAILABILITY OF SERVICES (VACANCY/CROWDEDNESS) |
| 4 | FRIENDS |
| 5 | PRICE |
| 6 | GRADE OF SERVICE (FIVE STAR, FOUR STAR, THREE STAR) |
|  |  |

FIG. 6A

USER B PROFILE

| PRIORITY | CONTEXT VALUE |
|---|---|
| 1 | FRIENDS |
| 2 | PRICE |
| 3 | PROXIMITY |
|  |  |

FIG. 6B

USER C PROFILE

| PRIORITY | CONTEXT VALUE |
|---|---|
| 1 | TIME-OF-DAY (11am-1pm): FOOD |
| 2 | PROXIMITY |
| 3 | TIME-OF-DAY (6pm-8pm): FOOD |
| 4 | PRICE |
|  |  |

FIG. 6C

| MATCH RANKING | PROXIMITY | PRICE | ENTITY OR SERVICE |
|---|---|---|---|
| 1 | 0.1 | $3 | McDONALD'S |
| 2 | 0.1 | $5 | PIZZA HUT |
| 2 | 0.1 | $5 | STARBUCKS |
| 3 | 0.2 | $2 | SUBWAY STATION |
| 4 | 0.3 | $2 | BUS TERMINAL |
| 5 | 0.4 | NA | SHOE STORE |
| 6 | 0.5 | NA | SEARS |
| 7 | 0.6 | $79 | HOLIDAY INN |
| 8 | 0.6 | $89 | HYATT HOTEL |
| 8 | 0.6 | $89 | HILTON HOTEL |
| 9 | NA | NA | YAHOO.COM |
|  |  |  |  |

FIG. 7

METHOD AND APPARATUS FOR DISPLAYING PRIORITIZED ICONS IN A MOBILE TERMINAL

FIELD OF THE INVENTION

The invention relates to the display of information on display screens of mobile terminals, such as cellular telephones, personal digital assistants (PDAs), and similar devices. More particularly, the invention provides a method and apparatus for displaying icons in such a way that certain icons are more prominently featured than other icons.

BACKGROUND OF THE INVENTION

Modern computer operating systems generally use pictures, such as icons, to represent application programs and documents on computer displays. The well-known MAC OS operating system from Apple Computer Corporation and the WINDOWS operating system from Microsoft Corporation are two examples of widely used graphics-oriented operating systems.

More recently, mobile terminals such as cellular telephones and wireless-enabled PDAs have incorporated graphics-oriented technology that allows a user to select application programs, web sites, and documents. Following increases in computing performance and memory capacity, mobile terminals now host an increasing number of application programs and capabilities. The Nokia 9210 COMMUNICATOR, for example, supports numerous functions such as telephone, fax, e-mail, calendar, and contacts features.

In order to maintain a convenient handheld form factor, the graphics displays for mobile terminals are necessarily small, thus limiting the amount of information that can be comfortably viewed at one time. Consequently, one problem confronting designers of such devices is determining how to maximize the number of icons and other graphical symbols on the display of such devices without making the symbols too small to see.

U.S. Pat. No. 6,047,197, entitled "Icon Driven Phone Menu System," describes a cellular telephone including a display mode selector that allows a user to select one of two display modes. In a first display mode, icons representing applications are arranged in rows and columns, thus allowing a user to navigate in two dimensions using cursor buttons. In a second display mode, the icons are displayed on one side of the cellular telephone display with a text field adjacent to each icon that identifies the icon.

Although the display modes in the aforementioned patent allow a user to navigate through numerous icons on the display, each icon takes up roughly the same amount of space on the display, regardless of its importance to the particular user. For example, if one user predominantly uses application programs A and B, whereas a second user predominantly uses application programs C and D, each user must navigate through the same set of icons in order to locate his or her desired application programs. Although it is possible for two users to customize their mobile terminals to delete certain applications that are rarely used, it may be undesirable to do so. Moreover, some users may want the ability to access an application program or other object (e.g., a document) even if it is only rarely needed. Consequently, there remains the problem of providing a display of icons that is specific to a particular user's needs.

As location-based information and location-based services become a reality, mobile terminal users will receive location-specific messages (e.g., advertisements for restaurants and movie theaters) broadcast from their environments. Because of the large quantity of information that will be transmitted, it will be necessary to restrict the services that are accessible to each user. One approach for restricting access is to define a personal profile for each user that defines that user's services of interest, as well as their priorities.

What is needed for mobile terminals is a technique to more efficiently represent a large number of icons on a small display in a manner that is tailored to a particular user's needs.

SUMMARY OF THE INVENTION

A first embodiment of the invention provides a method of displaying a plurality of icons on the display of a mobile terminal. The method includes a step of comparing one or more characteristics associated with each icon to one or more context values, such as time of day, geographic area, or user profile characteristics. Icons that best match one or more context values are represented in a display format that is enlarged in relation to other icons on the display device. The context values may include dynamically changing information, such as a current location of the user, so that as the user moves to a different geographic area, different icons are enlarged on the display device. The icons can correspond to application programs; logos (such as a corporate logo); documents; Web sites; or other objects.

A second embodiment of the invention provides a method of displaying a context bar on a display screen of a mobile terminal. The context bar includes a plurality of display icons that are arranged in a horizontal, vertical, or mixed fashion. Icons in the context bar are organized according to the degree to which they match one or more context values contained in a user's profile, such that icons that best match the user's profile are shown full-size and in a prominent location, whereas other icons are shown in a reduced-width format.

A third embodiment of the invention includes a mobile terminal configured with a microprocessor, a memory, and a display device that displays a plurality of icons. The icons are displayed on the display device using a display format (e.g., size) that relates to the degree with which each icon matches one or more context values, such as time of day, geographic location, or characteristics contained in a user's profile. As the user's profile or other characteristics change, the relative sizes of the icons may change, such that certain icons appear larger and are shown more prominently on the display, whereas other icons are not so prominently represented on the display.

A fourth embodiment of the invention includes a mobile terminal configured with a microprocessor, a memory, and a display device that displays a context bar. The context bar includes a plurality of display icons that are arranged in a horizontal, vertical, or mixed fashion. Icons in the context bar are organized according to the degree to which they match context values contained in a user's profile, such that icons that best match the user's profile are shown full-size, whereas other icons are shown in a reduced-width format.

The display characteristics of the icons can be modified such that certain icons appear wider, taller, brighter, enhanced in color or tone, etc. than other icons. Embodiments wherein certain icons are represented in a smaller form factor allow a large number of icons to be represented in a given display area while allowing the user to quickly identify icons that are likely to be used at any given time.

The invention allows the most important objects or icons to be shown in full size for easy access, while still allowing dozens of icons or objects to be displayed on a single display screen.

In one or more of the above embodiments, the user may control the criteria that determine how each icon is displayed, such that different mobile terminal users may potentially have differently prioritized icons. In some variations, selection of an icon causes a hyperlink (Universal Resource Locator) to be activated, thus launching a web application.

BRIEF DESCRIPTION OF THE DRAWINGS

FIG. 6A shows a priority-ordered list of context values contained in a first user's profile.

FIG. 6B shows a priority-ordered list of context values contained in a second user's profile.

FIG. 6C shows a priority-ordered list of context values contained in a third user's profile.

FIG. 7 shows a memory storage area containing a plurality of records ranked first according to proximity and secondarily according to price.

DETAILED DESCRIPTION OF THE INVENTION

Figure 1:
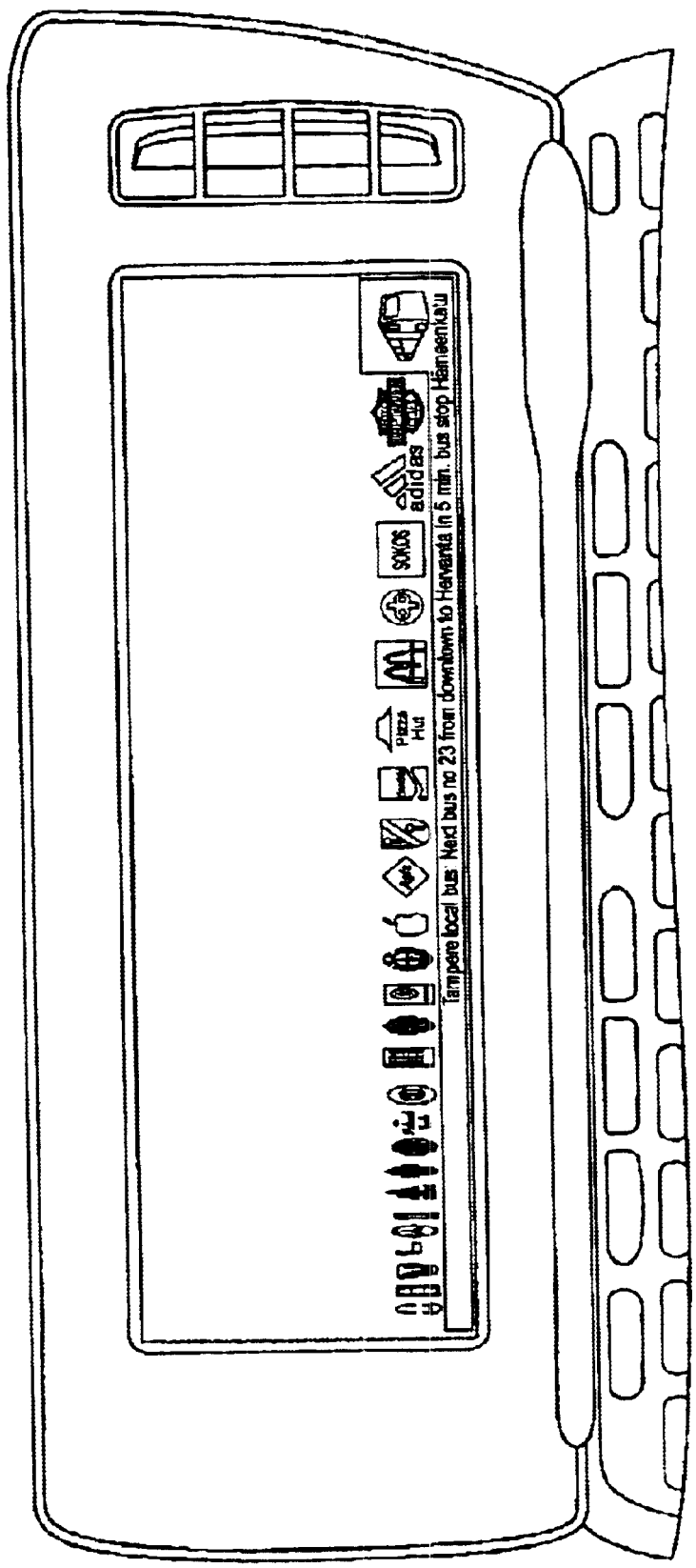
FIG. 1 shows a horizontal context bar including a plurality of icons having widths that correspond to the degree to which each icon matches one or more context values.

FIG. 1 shows a mobile terminal display on which is shown a horizontal context bar according to one embodiment of the invention. The mobile terminal may comprise a Nokia 9210 COMMUNICATOR, a cellular telephone, portable computer, or any other mobile device having a computer and display. In the embodiment shown in FIG. 1, the context bar comprises a plurality of icons displayed along an edge of the display, wherein different icons have different widths, wherein the width generally corresponds to the degree to which each icon matches one or more context values. Other visually discernible differences in icon display characteristics can be used to signify differences in matched values, such as different heights; colors; intensities; shapes; or the like. The icons can be arranged in a diagonal, vertical, horizontal, or other type of arrangement. Icons can also be presented in a circular, spiral, or other two-dimensional pattern radiating outward from a center point, such that icons in the center area are larger (or more prominent) than icons that radiate outwardly from the center.

In certain embodiments, context values may be identical for a group of mobile terminal users. In other embodiments, users can individually specify, prioritize, and modify context values. It is also of course possible to provide default context values that can be changed by a user.

One context value that can be used to match icons to display sizes is geographic location or proximity. As a mobile terminal moves around a geographic area, the terminal may receive messages from retail stores, restaurants, movie theaters, public transportation terminals, Web sites, and other entities. The messages can be provided to the mobile terminal based on the terminal's location within a predetermined geographic area (for example, the area served by a particular cell phone tower), or based on other factors (e.g., the identity of the mobile user, other demographic factors, or the precise geographic location of the mobile terminal.). According to one aspect of the invention, icons corresponding to messages received by the terminal are ranked according to one or more context values and displayed using a display format that indicates the degree of matching between characteristics associated with the icon and one or more of the context values.

Suppose that a mobile terminal user is in a geographic area that includes several restaurants, hotels, retail stores, bus terminals, and other entities. Suppose further that each of these entities transmits a message to mobile terminals in the area describing their services (including, in some variations, an icon depicting a corporate logo), their location, their availability, prices, and other information. Each of these entities could potentially try to solicit business from a particular mobile user, thereby inundating the user with commercial messages. According to one variation of the invention, icons corresponding to messages received from each entity are filtered and arranged according to the degree of proximity to the mobile terminal, such that entities that are closer to the mobile terminal are more prominently displayed than are entities that are further away from the mobile terminal. (Proximity can be derived by the mobile terminal based on a comparison of the terminal's specific location with the location of a particular entity, or it could be provided directly by the entity if the entity is able to discern the location of the mobile terminal). Other criteria (e.g., price, time of day, etc.) can also be used to filter and display icons corresponding to such entities and messages.

For example, suppose that the user of the mobile terminal of FIG. 1 has indicated that the most important criterion for displaying icons on the display is proximity to service. Accordingly, those entities having the closest proximity to the mobile terminal are represented using icons having a larger display format than other icons on the display. As shown in FIG. 1, for example, the bus terminal icon on the right side of FIG. 1 is represented in the largest display footprint, indicating that the bus terminal has the closest relative proximity to the mobile terminal in relation to services corresponding to other icons on the display. Other entities that are farther away from the mobile terminal are represented using a smaller icon size.

A second mobile user may have indicated that price is of paramount importance, all other values being equal. If four different hotels transmit messages to the mobile terminal of the second mobile user and include pricing information (e.g., rate per night), the hotels would be represented on the second mobile user's display using a display size that comports with their relative prices. Consequently, even if two different mobile terminals are operating in the same geographic area, it is possible to tailor the icon displays to best match each user's preferences.

Other context values that are possible include type of establishment (e.g., hotel, retail, movies, transportation); availability of service (e.g., less crowded or high vacancy establishments); friends (i.e., preference for indicating presence of other mobile units corresponding to known persons); time-of-day (e.g., preferences for certain types of services during certain time periods); and grade of service (e.g., four-star restaurants and hotels preferred over three-star establishments). Many other variations are of course possible.

As shown in FIG. 1, each icon may comprise a corporate logo or other graphic symbol corresponding to an application program, a hyperlink to a Web page, an informational message, a document, a prepopulated e-mail inquiry, or any of various other types of objects. The user of the mobile terminal can select any object using a conventional keypad, cursor button, stylus, or the like. In one embodiment, an icon selector, such as a magnifying glass metaphor seen at the far right portion of FIG. 1, can be used to highlight and select a desired icon. By moving the magnifying glass over an icon, a text message explaining or identifying the selected icon can be displayed at the bottom of the screen. In one variation, the magnifying glass, when moved over an icon that has a small size in relation to other icons, temporarily magnifies the icon to an enlarged size, thus facilitating the viewing of small or hard-to-read icons. Moreover, the context bar can be selectively activated or hidden according to a user's choice. It will be appreciated that other types of icon selectors can be used without departing from the principles of the invention.

Figure 2:
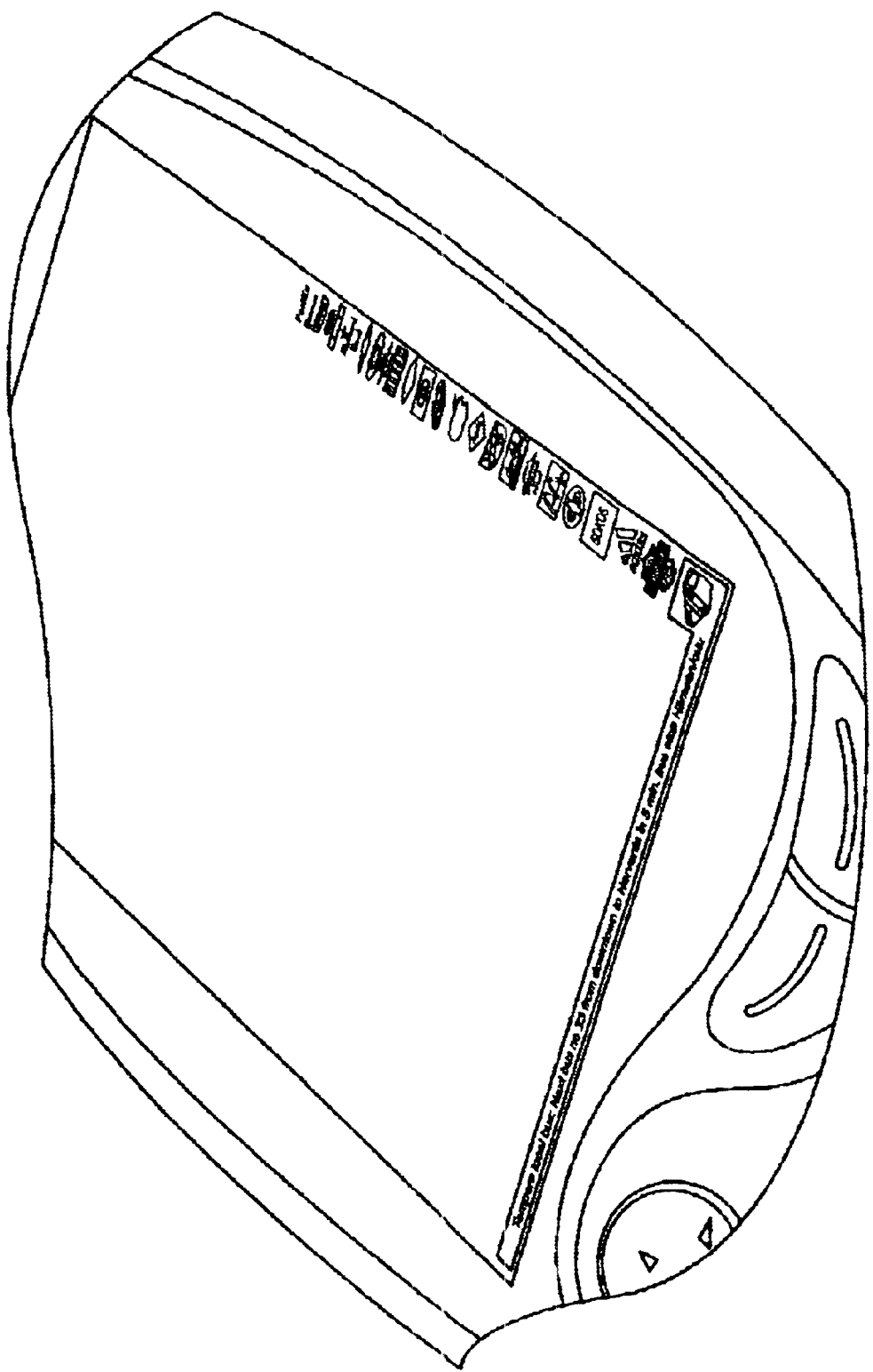
FIG. 2 shows a vertical context bar similar to the arrangement shown in FIG. 1.

FIG. 2 shows a vertical context bar similar to the arrangement shown in FIG. 1. In FIG. 2, the icons are arranged in a context bar along a vertical edge of a display screen.

Figure 3:
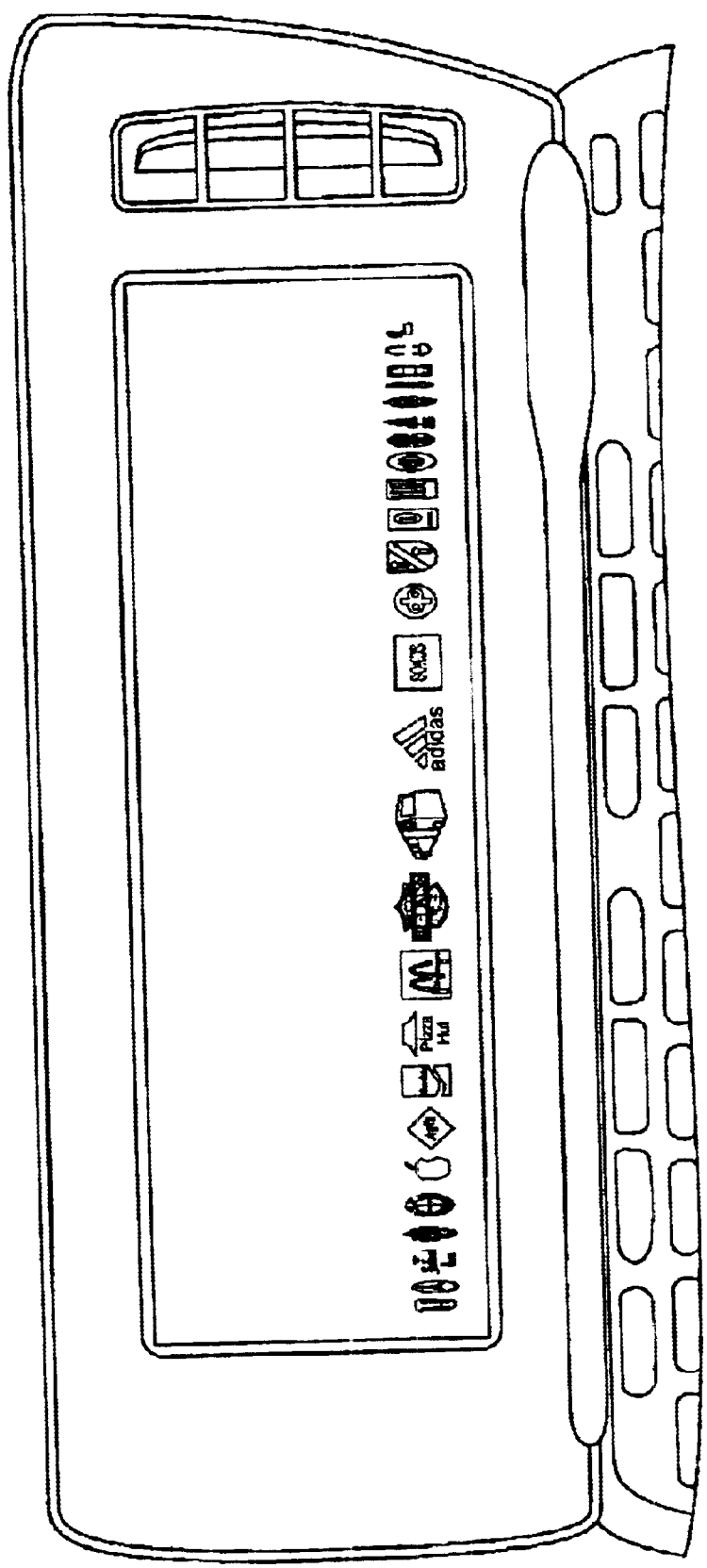
FIG. 3 shows a mixed context bar including a plurality of icons, wherein icons in the center of the context bar are enlarged to indicate that they better match one or more context values.

FIG. 3 shows a mixed context bar including a plurality of icons, wherein icons in the center of the context bar are enlarged to indicate that they better match one or more context values. In contrast to the embodiments of FIG. 1 and FIG. 2, the embodiment of FIG. 3 emphasizes icons in the center of the context bar, with icons having lesser degrees of matching radiating outward from both sides of the middle portion of the context bar. Other arrangements are of course possible, including a two-dimensional arrangement (e.g., a circle or a square arrangement of icons). Moreover, a user-specified position can be designated for the "best match" icons. Finally, although the icons are shown in the figures as having a gradually decreasing icon width corresponding to lower match values, icon sizes can of course be assigned based on a stratified matching approach, such that icons falling within a certain match range are assigned a first size, and icons falling within the next match range are assigned a second size that is smaller than the first size.

Figure 4:
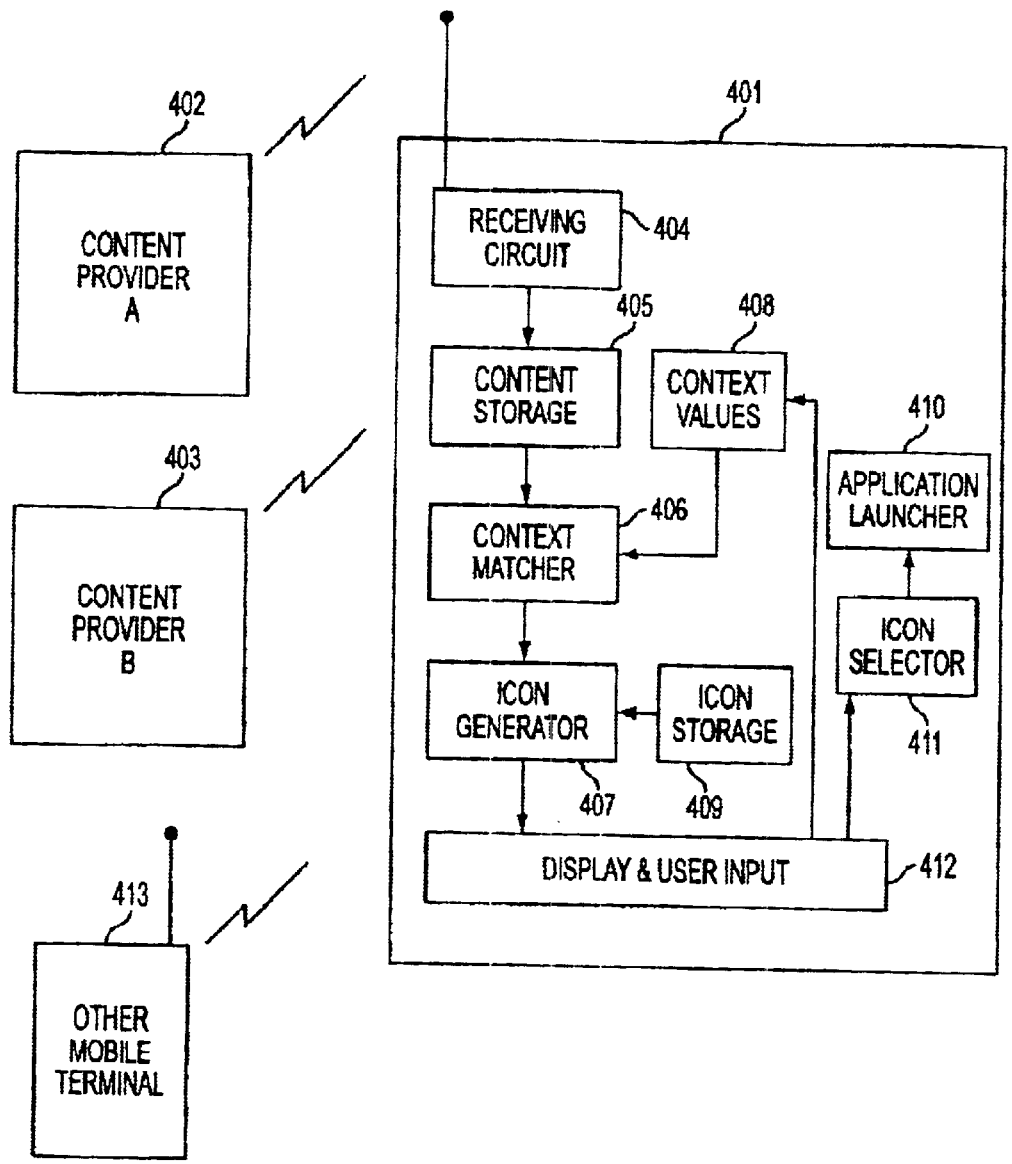
FIG. 4 shows a mobile terminal configured in accordance with various principles of the invention.

FIG. 4 shows a mobile terminal configured in accordance with various principles of the invention. Although not explicitly shown in FIG. 4, the mobile terminal may include a microprocessor or other computing device and memory for storing computer-executable instructions to carry out the principles of the invention. As shown in FIG. 4, the mobile terminal communicates with one or more content providers 402 and 403 through receiving circuit 404. This communication path preferably comprises a wireless means (e.g., radio frequency, optical, or other communication means). As explained above, content providers 402 and 403 may comprise corporate establishments (e.g., restaurants, travel agencies, hotels, and the like); Web sites; or other entities able to communicate with mobile terminal 401. Other mobile terminals 413 may also transmit messages to mobile terminal 401 and, as explained in more detail below, the user of mobile terminal 401 may specify that other known users (e.g., friends or family members) receive prioritized treatment in displaying associated icons.

Each content provider transmits messages that can be received by mobile terminal 401. Messages may include information such as the geographic location of an establishment; proximity of the establishment to a particular mobile user or other geographic location; price information; corporate logos; pictographic icons; hyperlinks to Web pages; advertisements (including audio, video, or text); entertainment services (e.g., music, videos, and the like); indicators identifying grades of service (e.g., AAA ratings, hotel "star" ratings, restaurant rankings, and the like); availability of services (e.g., indicating whether a hotel has vacancies; that a particular restaurant is crowded; or the average waiting time for service at a particular restaurant); personal e-mails from friends or family, or any other type of information. Any of this information can be matched with one or more context values in mobile terminal 401 in order to determine how a corresponding icon will be displayed.

Messages are received by receiving circuit 404 and stored in a content storage area 405. Messages may be time-stamped and expire or be deleted after a certain period of time. One or more context values (as described below) are stored in context value storage area 408 are matched with one or more fields in the messages in a context matcher function 406. Context matcher function 406 produces a ranked ordering of messages based on the one or more context values in storage area 408 uses the ranked ordering to drive an icon generator 407. Icon generator 407 retrieves one or more icons from icon storage area 409 (if not included in a message) and, based on the ranking information, generates a display of icons that are arranged and/or sized according to the rankings. In one embodiment, icon generator 407 generates on display 412 a context bar of the type depicted in FIGS. 1 to 3, although other types of icon displays are possible as explained above.

In one embodiment, a user of terminal 401 can modify context values contained in storage area 408 using a keypad, cursor, stylus, or similar input device associated with display 412. An optional icon selector function 411, for example a magnifying glass selector, allows the user to move over icons on the display to depict further information regarding the icons and to temporarily enlarge icons of potential interest. Other icon selectors can of course be used without departing from the inventive principles. Application launcher 410 launches an application associated with the selected icon in response to further user input. For example, application launcher 410 may start a Web browsing application if the particular icon has an associated hyperlink. Alternatively, if an icon represents a document, application launcher 410 can launch a document viewer or editor program.

Figure 5:
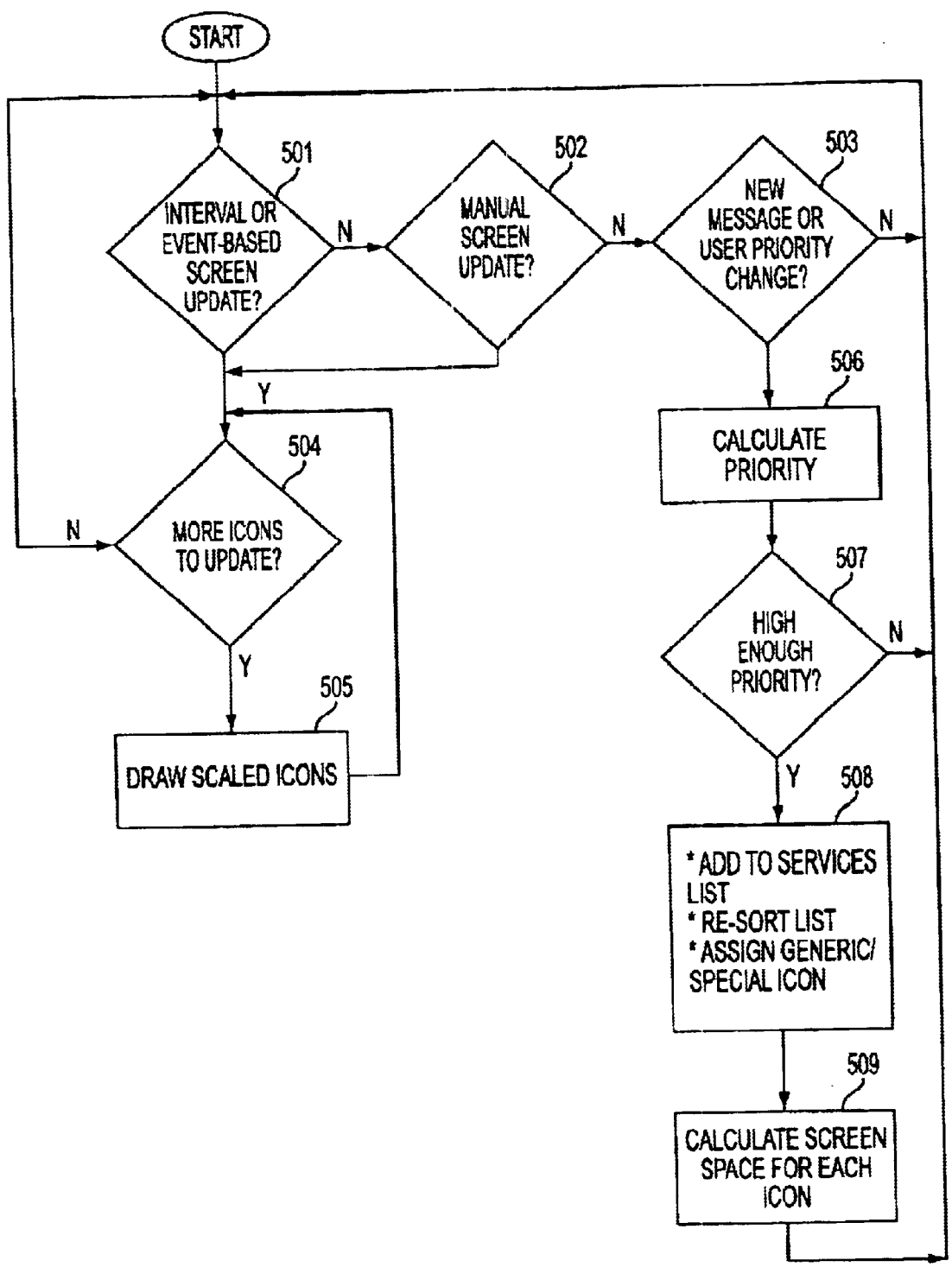
FIG. 5 shows a flowchart illustrating steps that can be performed to practice one or more methods according to the invention.

FIG. 5 shows a flowchart illustrating steps that can be performed to practice one or more methods according to the invention. In step 501, a check is made to determine whether an interval has expired or an event-based screen update is required. If not, then in step 502 a check is made to determine whether the user has manually updated the screen (e.g., moved objects on the display). If not, then in step 503, a check is made to determine whether a new message has been received or whether the user has changed a priority setting for a context value. If not, processing repeats back to step 501.

If in step 501 an interval has expired or an event-based screen update is required, then in steps 504 to 505 a loop is executed to update the icons on the display, wherein each icon is scaled and displayed. When there are no more icons to update, processing resumes in step 501.

If in step 502 a manual screen update occurred, then steps 504 and 505 are performed as outlined above.

If in step 503 a new message was received or the user changed a priority setting, then in step 506 the priority or ranking of the new message is calculated (if a new message was received) based on a context value and/or the user's profile. For example, as explained below, if a message is received from a hotel that is near to the mobile terminal, and the user's profile indicates that proximity to a service should receive the highest priority, then a high priority is assigned to the new message. (Alternatively, proximity can be calculated on a relative basis, such that each entity is assigned a proximity indicator corresponding to a distance from the mobile terminal). Step 506 may also include steps of extracting information from the message and storing it into context storage area 405 (e.g., price information and the like). If the user changed a priority setting (e.g., changed the importance of proximity to be lower than the importance of price), then the new priorities of previously stored messages in content storage area 405 are re-calculated.

In step 507, if the priority is not high enough compared to the user's profile, then processing resumes in step 501. Otherwise, if the priority is high enough, then step 508 is executed. In step 508, the service corresponding to the message is added to a services list; the list is re-sorted according to the current priority values; and each message is assigned to either a generic icon (if no entity-supplied icon is available, for instance a generic hotel icon) or a special icon (e.g., a corporate logo icon received from a hotel establishment). In step 509, the screen space for each icon is calculated, such that the icons can be displayed in the allocated display space. Various techniques for sizing the icons are possible; in one example, icon widths can be scaled by an amount proportional to their rankings in a table of sorted icons.

FIG. 6A shows a priority-ordered list of context values contained in a first user's profile. User A has selected proximity of service as the top priority, thus indicating that services having the closest proximity to the mobile unit (e.g., within a half-mile) should be ranked the highest, and corresponding icons should be displayed the most prominently on the display. The second priority relates to type of establishment, wherein the user may have selected one or more establishment types (e.g., food, retail, movies, and transportation). Services that best match these values will be ranked priority 2. Similarly, the user has indicated that availability of services (e.g., vacancy at a hotel or lack of crowds or waiting time at a restaurant) should receive priority level 3. Priority 4 has been specified for friends of the mobile terminal user; priority 5 has been specified for price of services; and priority 6 has been specified for grade of service (e.g., four-star hotels).

FIG. 6B shows a priority-ordered list of context values contained in a second user's profile. In contrast to the profile shown in FIG. 6A, User B has indicated that friends should be given the highest priority, even if they are not in close proximity to the user's mobile terminal. For example, if a friend of the user transmits e-mail messages to the user, an icon corresponding to that friend's messages could be featured most prominently on the display, even if the friend were not in the same geographic area. Also as seen in FIG. 6B, User B has specified that price should take precedence over proximity. Consequently, User B would prefer to see icons for hotels that are lower in price even if such hotels are not in the closest proximity to the mobile terminal. Because no other context values were specified by User B, remaining messages having characteristics not represented in the table would be given equal treatment.

FIG. 6C shows a priority-ordered list of context values contained in a third user's profile. As can be seen in FIG. 6C, User C has specified a top priority for food establishments during a specified time period (e.g., 11 am to 1 pm). Consequently, during that time period, icons corresponding to food establishments will be displayed in the largest format. User C has specified the next priority level for proximity, and thus establishments having a specified or relative proximity to User C's mobile terminal will be represented in a next largest display format. User C has specified another time-based context value again for food during the hours of 6 pm to 8 pm. Consequently, during that time period, proximity will take precedence over food establishments, but food establishments will take precedence over price (as indicated at priority level 4). Many different variations on the above-described scheme can be used without departing from the inventive principles.

FIG. 7 shows a data storage area containing a plurality of records ranked first according to proximity and secondarily according to price. Although many different approaches for ranking and storing records are possible, according to the variation shown in FIG. 7, each record is assigned a ranking based on user-specified context values (in this case, proximity and price). As shown in FIG. 7, a number of different entities or services have transmitted messages to the mobile terminal. Each message includes information such as proximity to the mobile terminal (or geographic location, from which proximity can be derived) and price information (except in the case of the shoe store and Sears, both of which sell many differently priced items, and the Yahoo.com Web site, for which price is not particularly relevant).

According to FIG. 7, the records are ranked based on matching first on the proximity values and second on the price values. For example, the first three entries (corresponding to McDonald's, Pizza Hut, and Starbucks) all are located the same distance (0.1 kilometer or mile) from the mobile terminal, and thus are ranked as the first three records in the table. However, because McDonald's offers a lower average cost per meal ($3 compared to $5 for Pizza Hut and Starbucks), McDonald's is listed as the first of the three records. Similar relationships hold true for the remaining records in the table. Consequently, in one variation of the invention, the records in the table of FIG. 7 are used to display corresponding icons having sizes that decrease according to the order in which the records appear in the table.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. In a mobile terminal, a method of displaying a plurality of icons that can be selected by a user from a display on the mobile terminal, the method comprising the steps of:

(1) comparing one or more characteristics associated with each of the plurality of icons to one or more context values that are specific to the user of the mobile terminal;

(2) representing at least one of the plurality of icons having one or more characteristics that best match the one or more context values using a display format that is enlarged in relation to the remaining plurality of icons; and (3) representing at least some of the remaining plurality of icons having characteristics that do not best match the one or more context values using a display format that is smaller than the enlarged format.

2. The method of claim 1, wherein step (1) comprises the step of comparing characteristics that relate to a current location of the user.

3. The method of claim 1, wherein step (1) comprises the step of comparing characteristics that relate to a time of day.

4. The method of claim 3, wherein step (1) comprises the step of comparing a service associated with one or more of the icons during the time of day, such that certain services will be preferred over other services during the particular time of day.

5. The method of claim 1, wherein step (1) comprises the step of comparing a price associated with a service corresponding to one or more of the plurality of icons.

6. The method of claim 1,
wherein step (1) comprises the step of comparing services of a user-specified type, and
wherein step (2) comprises the step of displaying icons corresponding to the user-specified type of services in the enlarged format.

7. The method of claim 1,
wherein step (1) comprises the step of comparing a user-specified grade of services, and
wherein step (2) comprises the step of displaying icons corresponding to the user-specified grade of services in the enlarged format.

8. The method of claim 1, further comprising the step of receiving a plurality of messages at the mobile terminal and associating each message with one of the plurality of icons.

9. The method of claim 8, wherein at least one of the icons is extracted from one of the messages received at the mobile terminal.

10. The method of claim 8, wherein step (1) comprises the step of comparing characteristics extracted from one or more of the messages received at the mobile terminal to the one or more context values.

11. The method of claim 1, wherein step (1) comprises the step of comparing a plurality of characteristics to a plurality of context values, wherein at least some of the plurality of context values are set by the user of the mobile terminal.

12. The method of claim 1, further comprising the step of, in response to the user selecting one of the icons, launching an application program associated with the selected icon.

13. The method of claim 1, wherein steps (2) and (3) are performed by displaying each of the plurality of icons in a context bar that is positioned along an edge of the display.

14. The method of claim 1, wherein at least some of the icons represent logos that, when selected by the user, retrieve a Web page from a Web site affiliated with the selected logo.

15. The method of claim 14, wherein the logos identify a corporation.

16. The method of claim 14, wherein the logos represent a symbolic link.

17. The method of claim 1, wherein step (3) comprises the step of representing the remaining icons using a reduced width format as compared to the at least one best match icon in step (2).

18. The method of claim 14, wherein one of the icons comprises a symbolic logo and a second of the icons comprises a corporate logo represented on a display of the mobile terminal.

19. The method of claim 1, further comprising the step of displaying a magnifying glass display element that is movable by the user in relation to the plurality of icons, wherein moving the magnifying glass display element temporarily enlarges a user-selected one of the displayed icons.

20. In a mobile terminal, a method of displaying a plurality of icons that can be selected by a user from a display on the mobile terminal, the method comprising the steps of:

(1) receiving a plurality of messages at the mobile terminal, each message having an associated display icon and service information relating to a service that is potentially available to the user of the mobile terminal;

(2) comparing the service information extracted from each message received in step (1) to one or more context values that pertain to the user of the mobile terminal;

(3) displaying icons corresponding to messages having service information that best matches the one or more context values in an enlarged format on the display of the mobile terminal; and (4) displaying other icons in a non-enlarged format on the display of the mobile terminal.

21. The method of claim 20,
wherein step (1) comprises the step of receiving proximity information for a plurality of different services; and
wherein step (3) comprises the step of displaying in the enlarged format icons corresponding to messages relating to services that have the closest proximity to the mobile terminal.

22. The method of claim 21, wherein step (3) comprises the step of displaying in the enlarged format icons corresponding to hotels that have the closest proximity to the mobile terminal.

23. The method of claim 21, wherein step (3) comprises the step of displaying in the enlarged format icons corresponding to restaurants that have the closest proximity to the mobile terminal.

24. The method of claim 21, wherein step (3) comprises the step of displaying in the enlarged format icons corresponding to retail stores that have the closest proximity to the mobile terminal.

25. The method of claim 20,
wherein step (1) comprises the step of receiving price information for a plurality of services; and
wherein step (3) comprises the step of displaying in the enlarged format icons corresponding to messages relating to services that have the best match price information.

26. The method of claim 20,
wherein step (2) comprises the step of comparing the service information to a plurality of context values arranged in a user-specified priority order, such that services that match a first context value are assigned a first priority and services that match a second context value are assigned a second priority; and
wherein step (3) comprises the step of displaying icons in an ordered arrangement according first to the first priority and second to the second priority.

27. The method of claim 20, wherein step (3) comprises the step of displaying the icons in a context bar along an edge of the display of the mobile terminal.

28. The method of claim 20, further comprising the step of displaying a magnifying glass display element that is movable by the user in relation to the plurality of icons, wherein moving the magnifying glass display element temporarily enlarges a user-selected one of the displayed icons.

29. The method of claim 20, further comprising the step of, in response to receiving an additional message at the mobile terminal having service information that provides a better match to the one or more context values, displaying an icon corresponding to the additional message in an enlarged display format compared to icons previously displayed in step (3).

30. A mobile terminal comprising:
a display capable of displaying graphical icons;
a user input device that permits a user of the mobile terminal to select one or more of the graphical icons displayed on the display; and
a processor programmed with computer-executable instructions that, when executed, perform the steps of:
(1) comparing one or more characteristics associated with each of the plurality of graphical icons to one or more context values that are specific to the user of the mobile terminal;
(2) representing at least one of the plurality of icons having one or more characteristics that best match the one or more context values using a display format that is enlarged in relation to the remaining plurality of icons; and
(3) representing at least some of the remaining plurality of icons having characteristics that do not best match the one or more context values using a display format that is smaller than the enlarged format.

31. The mobile terminal of claim 30, wherein the processor further performs the step of comparing characteristics that relate to a current location of the user.

32. The mobile terminal of claim 30, wherein the processor further performs the step of comparing characteristics that relate to a time of day.

33. The mobile terminal of claim 32, wherein the processor further performs the step of comparing a service associated with one or more of the icons during the time of day, such that certain services will be preferred over other services during the particular time of day.

34. The mobile terminal of claim 30, wherein the processor compares a price associated with a service corresponding to one or more of the plurality of icons.

35. The mobile terminal of claim 30, wherein the processor compares services of a user-specified type and displays icons corresponding to the user-specified type of services in the enlarged format.

36. The mobile terminal of claim 30, wherein the processor compares a user-specified grade of services and displays icons corresponding to the user-specified grade of services in the enlarged format.

37. The mobile terminal of claim 30, wherein the processor receives a plurality of messages at the mobile terminal and associates each message with one of the plurality of icons.

38. The mobile terminal of claim 37, wherein at least one of the icons is extracted from one of the messages received at the mobile terminal.

39. The mobile terminal of claim 37, wherein the processor compares characteristics extracted from one or more of the messages received at the mobile terminal to the one or more context values.

40. The mobile terminal of claim 30, wherein the processor compares a plurality of characteristics to a plurality of context values, wherein at least some of the plurality of context values are set by the user of the mobile terminal.

41. The mobile terminal of claim 30, wherein the processor, in response to the user selecting one of the icons, launches an application program associated with the selected icon.

42. The mobile terminal of claim 30, wherein the processor displays each of the plurality of icons in a context bar that is positioned along an edge of the display.

43. The mobile terminal of claim 30, wherein at least some of the icons represent logos that, when selected by the user, retrieve a Web page from a Web site affiliated with the selected logo.

44. The mobile terminal of claim 43, wherein the logos identify a corporation.

45. The mobile terminal of claim 43, wherein the logos represent a symbolic link.

46. The mobile terminal of claim 30, wherein the processor represents the remaining icons using a reduced width format as compared to the at least one best match icon in step (2).

47. The mobile terminal of claim 43, wherein one of the icons comprises a symbolic logo and a second of the icons comprises a corporate logo represented on a display of the mobile terminal.

48. The mobile terminal of claim 30, wherein the processor displays a magnifying glass display element that is movable by the user in relation to the plurality of icons, wherein moving the magnifying glass display element temporarily enlarges one of the displayed icons.

49. The mobile terminal of claim 48, wherein the processor, in response to moving the magnifying glass display element over one of the displayed icons, displays a text box containing further information regarding the icon.

50. A mobile terminal comprising:
a display capable of displaying graphical icons;
a user input device that permits a user of the mobile terminal to select one or more of the graphical icons displayed on the display; and
means for displaying on the display device certain icons in an enlarged display format in response to determining that information associated with the certain icons matches a user-specified context value.

51. The mobile terminal of claim 50, wherein the icons correspond to messages received by the mobile terminal, the mobile terminal further comprising means for extracting from the messages the information and associating the information with the certain icons.

52. A mobile terminal comprising:
a receiving circuit that receives a plurality of messages containing information relating to a particular service that is potentially available to a user of the mobile terminal;
a memory storage area that stores the plurality of messages;
a context value storage area that stores one or more context values that pertain to the user of the mobile terminal;
a display unit capable of displaying graphical icons; and
a context matching function that compares information extracted from each of the plurality of messages to the one or more context values and, in response to detecting a match, causes graphical icons corresponding to the information resulting in the match to be displayed in an enlarged format on the display unit.

53. The mobile terminal of claim 52, further comprising a user input device configured to permit the user to change the one or more context values.

54. The mobile terminal of claim 52, wherein the context matching function causes graphical icons corresponding to services that are within a matched proximity of the mobile terminal to be displayed in the enlarged format on the display unit.

* * * * *